United States Patent
Tennant

(10) Patent No.: US 8,958,471 B2
(45) Date of Patent: Feb. 17, 2015

(54) METHOD, APPARATUS, AND SYSTEM FOR SLIDING MATRIX SCOREBOARD UTILIZED IN AUTO FEEDBACK CLOSED LOOPS

(71) Applicant: Intel Corporation, Santa Clara, CA (US)

(72) Inventor: Bruce A. Tennant, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/843,137

(22) Filed: Mar. 15, 2013

(65) Prior Publication Data

US 2014/0269884 A1    Sep. 18, 2014

(51) Int. Cl.
*H03H 7/30*    (2006.01)
*H04L 25/03*    (2006.01)

(52) U.S. Cl.
CPC ................. *H04L 25/03885* (2013.01)
USPC ............ 375/232; 375/229; 375/230; 375/231

(58) Field of Classification Search
CPC ...................................... H04L 1/0019
USPC .......... 375/267, 260, 259, 299, 232, 229–231
See application file for complete search history.

(56) References Cited

U.S. PATENT DOCUMENTS

| | | | |
|---|---|---|---|
| 8,599,913 B1 * | 12/2013 | Brown et al. | 375/232 |
| 2012/0145779 A1 * | 6/2012 | Bietenbeck et al. | 235/375 |
| 2013/0034143 A1 * | 2/2013 | Acosta-Serafini et al. | 375/232 |

* cited by examiner

*Primary Examiner* — Qutbuddin Ghulamali
(74) *Attorney, Agent, or Firm* — Patent Capital Group

(57) ABSTRACT

Requests are identified for equalization coefficients and a plurality of coefficient selections are tracked relating to the requests. A matrix is maintained within a grid space that is to represent the coefficients, the matrix representing one or more of the coefficient selections. The matrix is adjusted within the grid space to obtain an adjusted matrix that is to accommodate selection of a particular coefficient outside the matrix. A final coefficient can be selected based on the adjusted matrix.

29 Claims, 12 Drawing Sheets

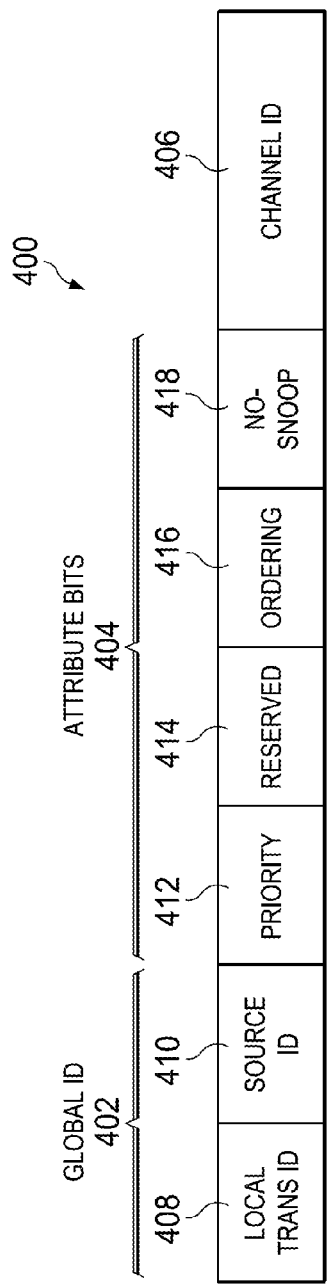
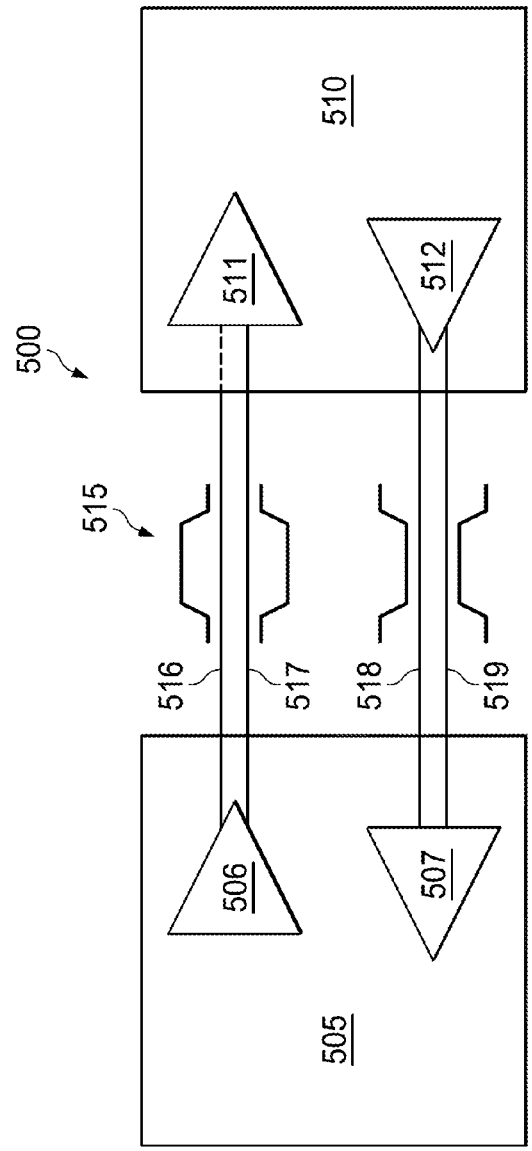

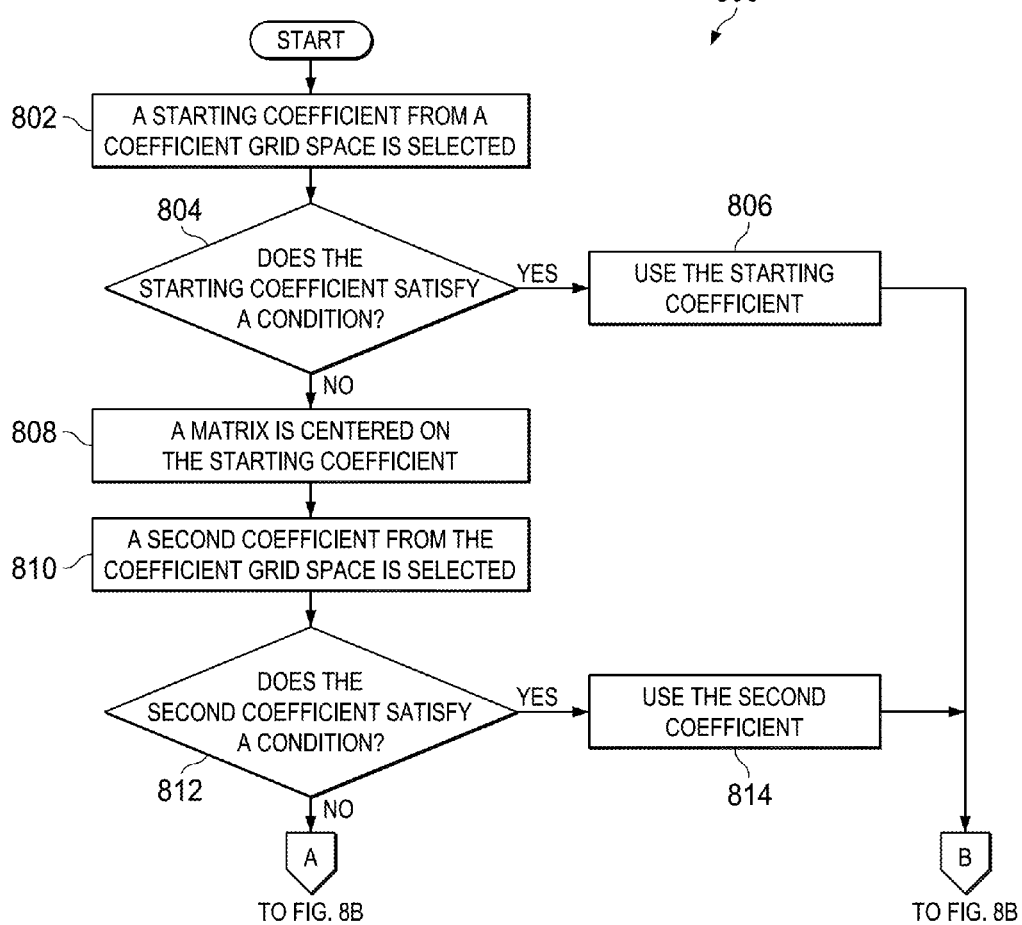

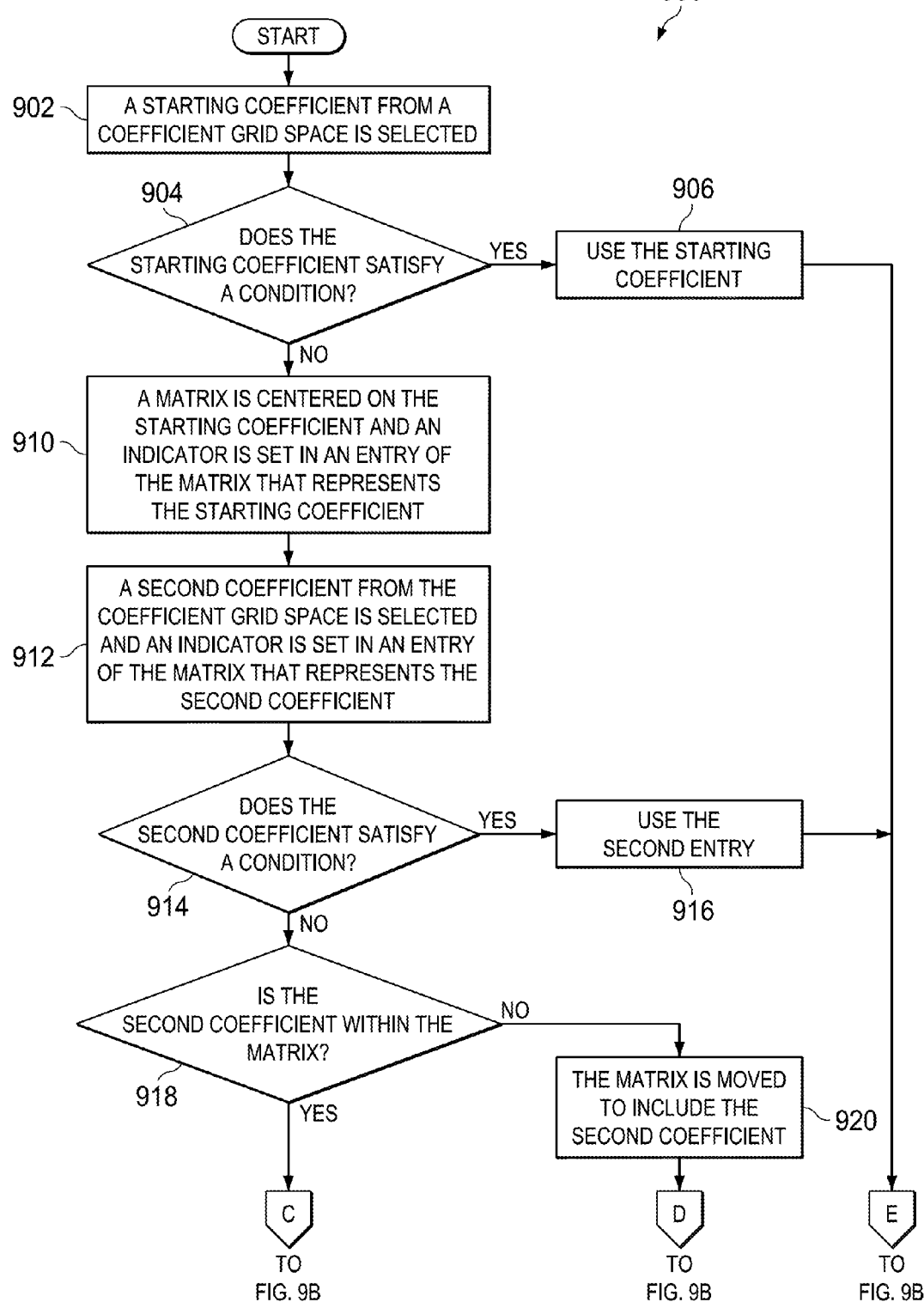

METHOD, APPARATUS, AND SYSTEM FOR SLIDING MATRIX SCOREBOARD UTILIZED IN AUTO FEEDBACK CLOSED LOOPS

FIELD

This disclosure pertains to computing system, and in particular (but not exclusively) to back channel equalization.

BACKGROUND

As electronic apparatuses become more complex and ubiquitous in the everyday lives of users, more and more diverse requirements are placed upon them. To satisfy many of these requirements, many electronic apparatuses comprise many different devices, such as a CPU, a communication device, a graphics accelerator, etc. In many circumstances, there may be a large amount of communication between these devices. Furthermore, many users have high expectations regarding apparatus performance. Users are becoming less tolerant of waiting for operations to be performed by their apparatuses. In addition, many apparatuses are performing increasingly complex and burdensome tasks that may involve a large amount of inter-device communication. Therefore, there may be some communication between these devices that would benefit from rapid communication and an acceptable reduced bit error rate.

BRIEF DESCRIPTION OF THE DRAWINGS

Embodiments are illustrated by way of example and not by way of limitation in the FIGURES of the accompanying drawings, in which like references indicate similar elements and in which:

FIG. 4 illustrates an embodiment of a request or packet to be generated or received within an interconnect architecture according to at least one example embodiment.

FIG. 5 illustrates an embodiment of a transmitter and receiver pair for an interconnect architecture according to at least one example embodiment.

FIGS. 8A and 8B are flow diagrams according to at least one example embodiment.

FIGS. 9A and 9B are yet other flow diagrams according to at least one example embodiment.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to back channel equalization in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from an improved back channel equalization. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for back channel equalization.

Figure 1:
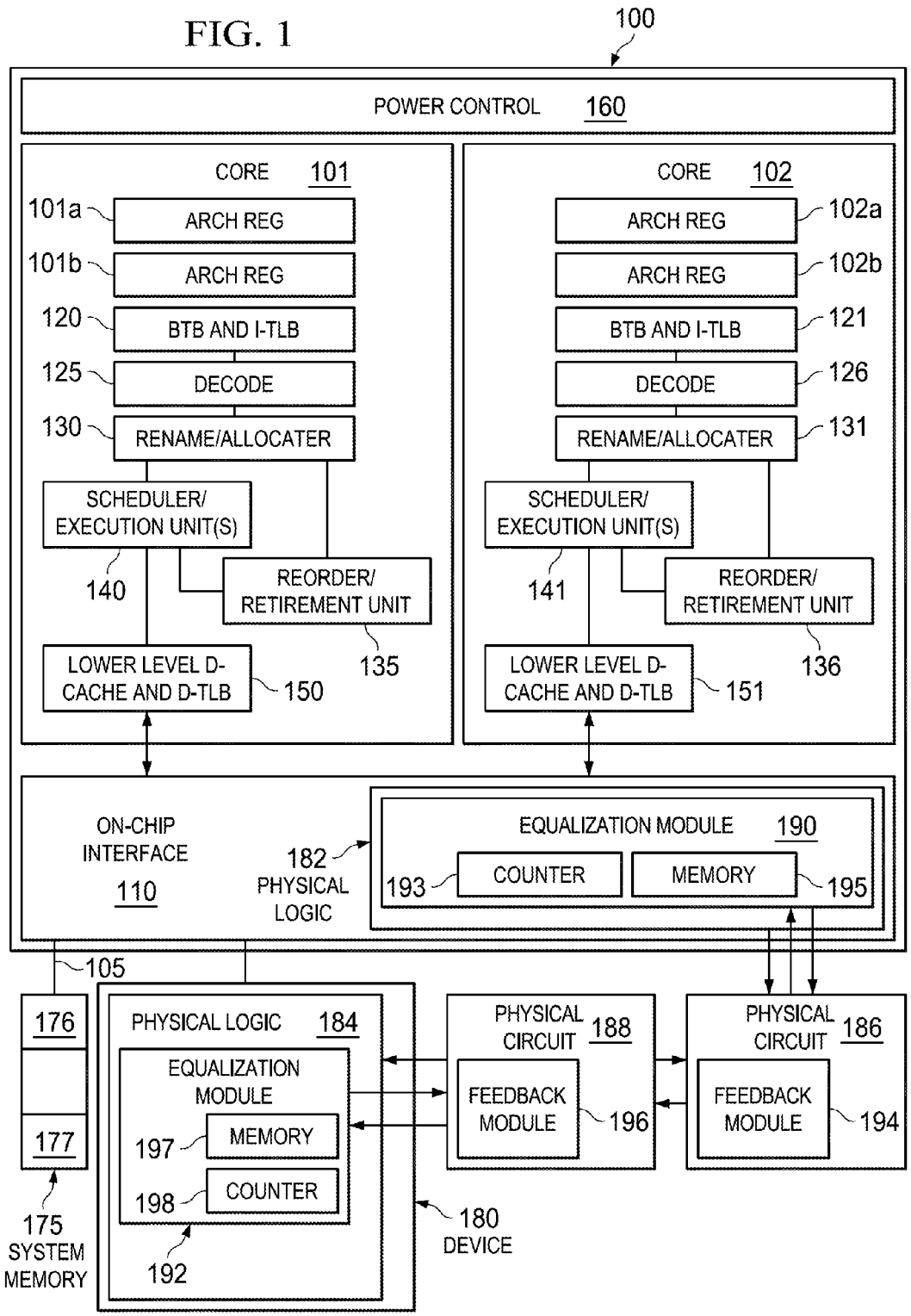
FIG. 1 illustrates an embodiment of a block diagram for a computing system including a multicore processor according to at least one example embodiment.

FIG. 1 is a block diagram illustrating components associated with improving back channel equalization according to at least one example embodiment. The examples of FIG. 1 are merely examples of components associated with back channel equalization, and do not limit the scope of the claims. For example, operations attributed to a component may vary, number of components may vary, composition of a component may vary, and/or the like. For example, in some example embodiments, operations attributable to one component of the example of FIG. 1 may be allocated to one or more other components.

Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, branch target buffer (BTB) and instruction-translation buffer (I-TLB) 120, load/store buffers, and queues may be shared through partitioning. Other resources, such as general purpose internal registers, page-table base register(s), low-level data-cache and data-TLB 150, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a BTB and I-TLB 120 to predict branches to be executed/taken and a BTB and I-TLB 120 to store address translation entries for instructions.

Core 101 further includes decode module 125 coupled to BTB and I-TLB 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 125, in one embodiment, recognize the same ISA (or a subset thereof). Alternatively, in a heterogeneous core environment, decoders 125 recognize a second ISA (either a subset of the first ISA or a distinct ISA).

In one example, renamer/allocator block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface module 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, device 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

On-chip interface can include physical logic 182. Physical logic 182 can include an equalization module 190. Equalization module 190 can include memory 195 and counter 193. Device 180 may include physical logic 184 (which is similar to physical logic 182 in on-chip interface 110). Physical logic 184 can include equalization module 192. Equalization module 192 can include memory 197 and counter 198. Equalization modules 190 and 192 are similar and during one set of operations, equalization module 190 may act as a master equalization module and equalization module 192 may act as a slave equalization module. Then in another set of operations, equalization module 190 may act as a slave equalization module and equalization module 192 may act as a master equalization module. Communications between physical logic 182, physical logic 184, equalization module 190, and equalization module 192 may flow through physical circuit 186 and physical circuit 188. Physical circuit 186 and physical circuit 188 are similar but will perform different functions depending on equalization module 190 being a master and equalization module 192 being a slave or equalization module 190 being a slave and equalization module 192 being a master. Physical circuit 186 can include feedback module 194 and physical circuit 188 can include feedback module 196. On-chip interface 110 and device 180 may communicate through a peripheral component interconnect express three (PCIe3) connection.

PCIe3 can include back channel equalization to improve the bit error rate (BER) for communications between on-chip interface 110 and device 180. In many designs, low level receiver circuitry (e.g., LMS algorithms and DFE) can evaluate an incoming data stream and give a simple up/down indication for C-1 and C+1 equalization cursors (where C is a current bit). This process can be repeated over and over until the receiver determines that the incoming stream has adequate characteristics to meet a BER of 10-12 or better (for example). Because the process is iterative, there is typically no logic in the receiver circuitry to know if the process has resulted in a never ending loop of requests to a controller or agent.

In an example implementation, physical layer logic (e.g., physical layer logic 182) may request coefficient updates that eventually result in repeating a prior coefficient. Unfortunately, this can result in endless evaluation loops that then result in a timeout in a master evaluation phase. Equalization module 192 may act as a master equalization module and use a special matrix to track the attempted coefficients. The matrix can create a sliding scoreboard grid (e.g., a 7×7 grid). The information stored in the grid may be a center point's coefficient and a single bit for each coefficient around the center coefficient. The single bit can represent a "seen" or "not seen" state of that coefficient. As new requests progress, the center of the matrix may slide in the direction of the new request if that request would have resulted in a coefficient outside the range of the grid. The result is the ability to be able to identify most prior coefficients (at minimum, the width of the grid) with the potential of up to the total area of grid. For example, a 7×7 grid could track at least the last 7 attempts and up to as many as the last 49. In addition, a repeat limit control register (e.g., counter 193 or counter 198) may be used to allow for some set of repeats before aborting the evaluation and choosing a coefficient that provided acceptable results.

A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
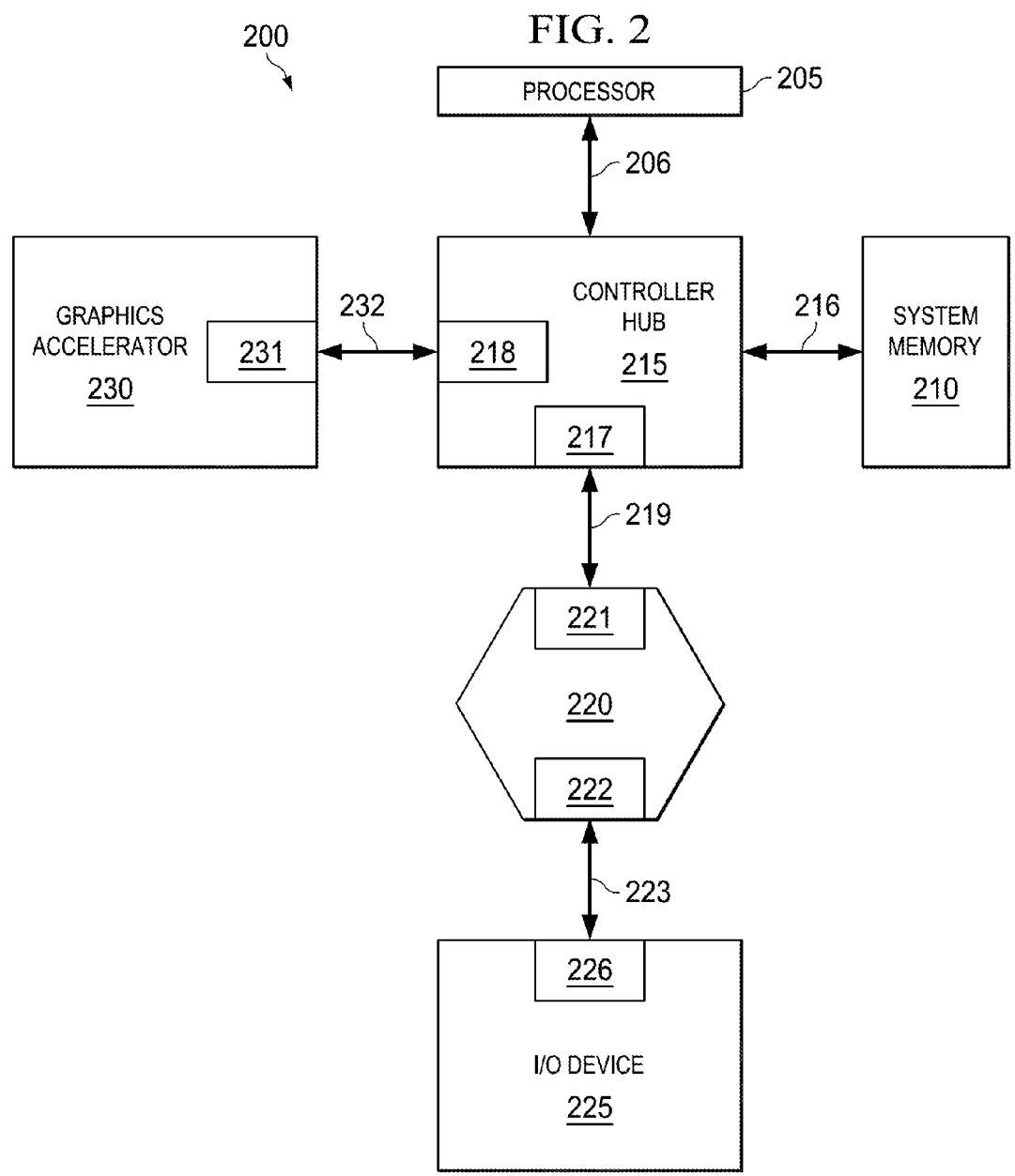
FIG. 2 illustrates an embodiment of a computing system including an interconnect architecture according to at least one example embodiment.

Referring to FIG. 2, an embodiment of a fabric composed of point-to-point links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through root complex 215.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
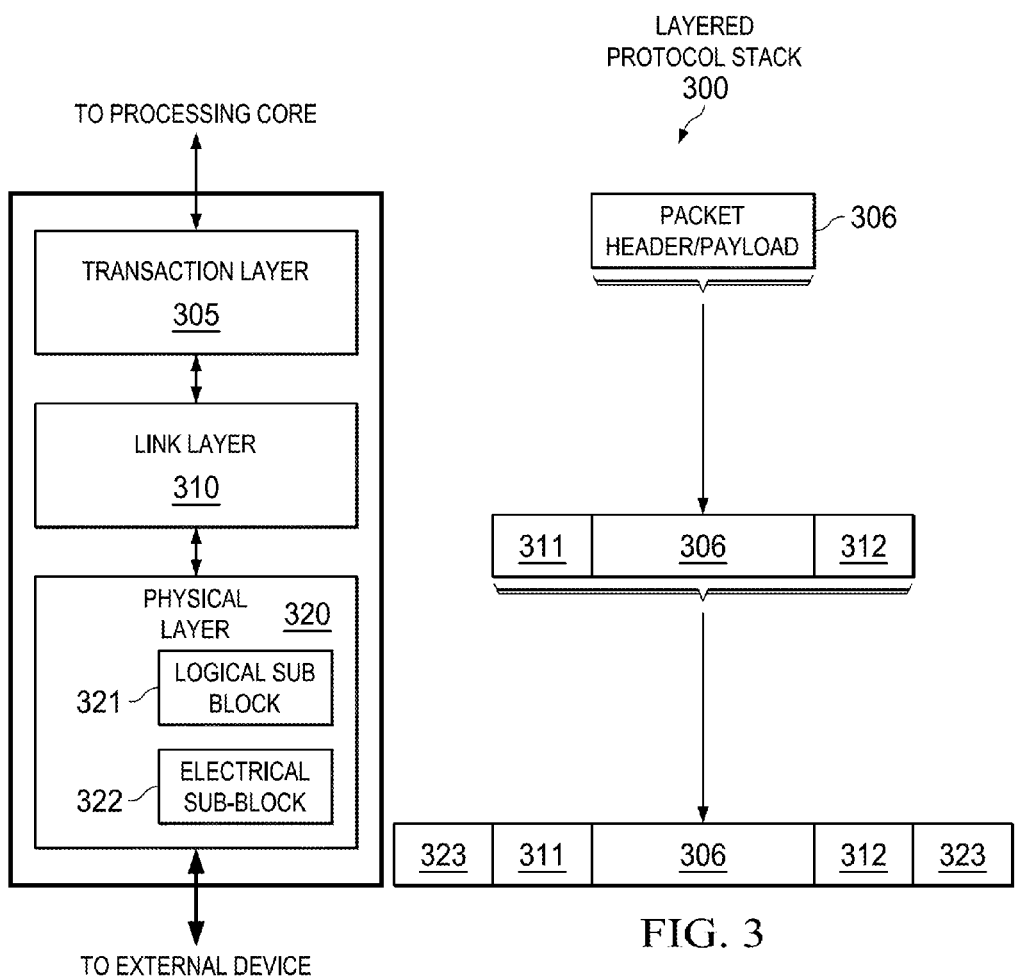
FIG. 3 illustrates an embodiment of a interconnect architecture including a layered stack according to at least one example embodiment.

Referring to FIG. 3, an embodiment of a layered protocol stack is illustrated. Layered protocol stack 300 includes any form of a layered communication stack, such as a Quick Path Interconnect (QPI) stack, a PCie stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that can be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The translation layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 2, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents. Therefore, in one embodiment, transaction layer 305 assembles packet header/payload 306. Format for current packet headers/payloads may be found in the PCIe specification at the PCIe specification website.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 418 is utilized to determine if transactions are snooped. As shown, channel ID Field 406 identifies a channel that a transaction is associated with.

Link Layer

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e. paths 516 and 517, and two receiving paths, i.e. paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 6A:
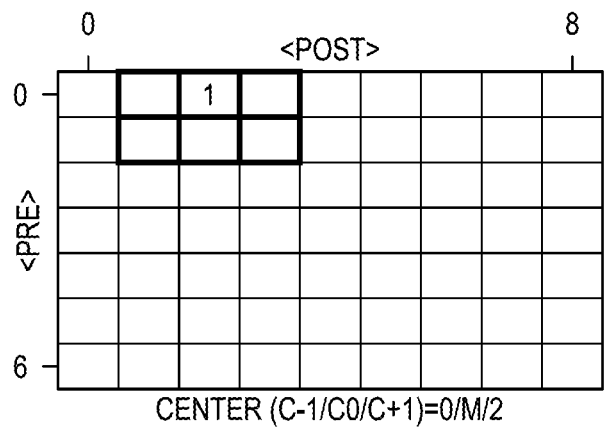
FIGS. 6A-6I illustrate an embodiment of a coefficient grid space according to at least one example embodiment.
Figure 6B:
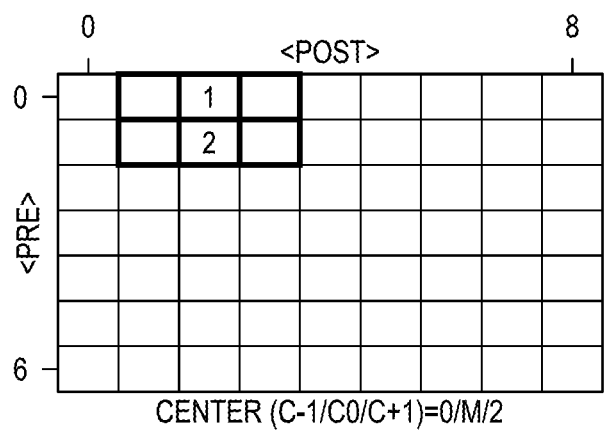
Figure 6C:
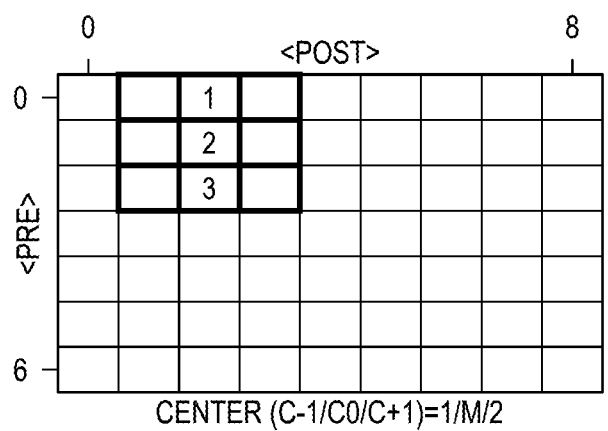

Referring to FIGS. 6A-6I, FIGS. 6A-6I illustrate an example coefficient grid space that shows both the sliding nature of a tracking coefficient matrix as well as the detection of a repeated coefficient. In the illustrated coefficient grid space, each box represents a coefficient. The parameters of the example matrix are reduced for illustration purposes (e.g., 3×3 grid, FS=24/LF=8). As illustrate in FIG. 6A, a starting coefficient (represented by the box with the number 1) orientates the matrix by aligning the starting coefficient as the matrix's center coefficient of 0/M/2 (note that C0 is not tracked as it can be derived from FS, C−1, and C+1). As illustrated in FIG. 6B, a request for a second coefficient (represented by the box with the number 2) can occur. As illustrated in FIG. 6C, a request for a third coefficient (represented by the box with the number 3) can occur. Because the third coefficient in the coefficient grid space is outside of the matrix shown in FIGS. 6A and 6B, the center of the matrix center can be shifted down by one to include the third coefficient in the matrix and the new center of the matrix becomes 1/M/2.

Figure 6D:
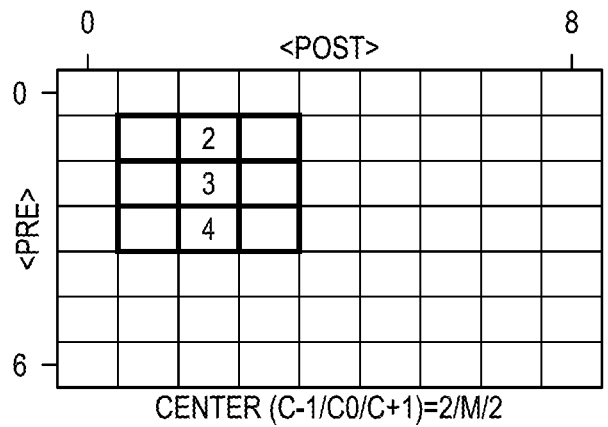
Figure 6E:
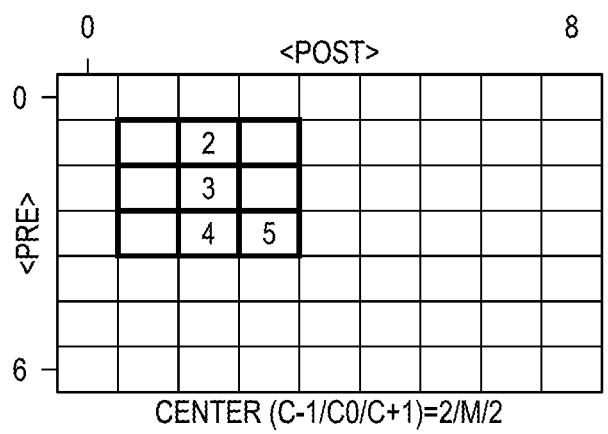

As illustrated in FIG. 6D, a request for a fourth coefficient (represented by the box with the number 4) occurs and the matrix again moves down, resulting in the matrix shifting its center down by one such that the new center is now 2/M/2. In this case, the starting coefficient (illustrated as box 1 in FIGS. 6A-6C) is lost and if the coefficient is later repeated, the previous use of the coefficient would go undetected (the loss of the starting coefficient could be prevented if the matrix was bigger). As illustrated in FIG. 6E, a request for a fifth coefficient (represented by the box with the number 5) can occur. Note that the fifth coefficient in the coefficient grid space is inside of the matrix shown in FIG. 6D so the matrix center does not need to be shifted.

Figure 6F:
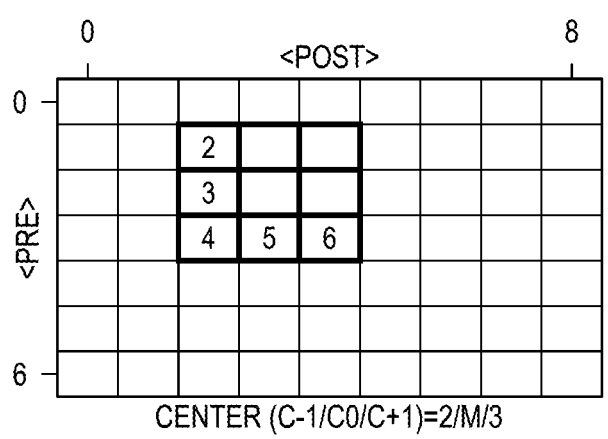
Figure 6G:
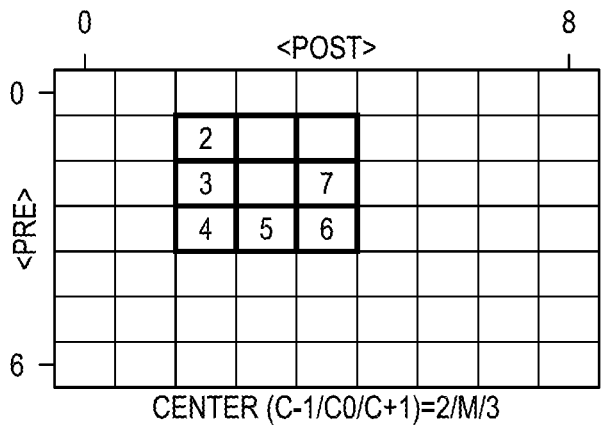
Figure 6H:
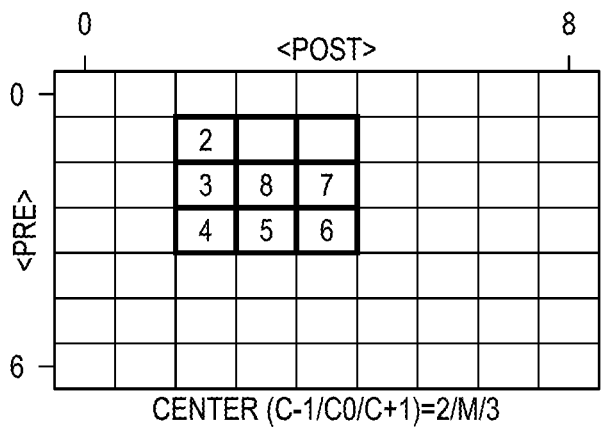

As illustrated in FIG. 6F, a request for a sixth coefficient (represented by the box with the number 6) can occur. Because the sixth coefficient in the coefficient grid space is outside of the matrix shown in FIGS. 6D and 6E, the center of the matrix center can be shifted across by one to include the sixth coefficient in the matrix and the new center of the matrix becomes 2/M/3. As illustrated in FIG. 6G, a request for a seventh coefficient (represented by the box with the number 7) can occur, and further, as illustrated in FIG. 6H, a request for an eighth coefficient (represented by the box with the number 8) can occur.

Figure 6I:
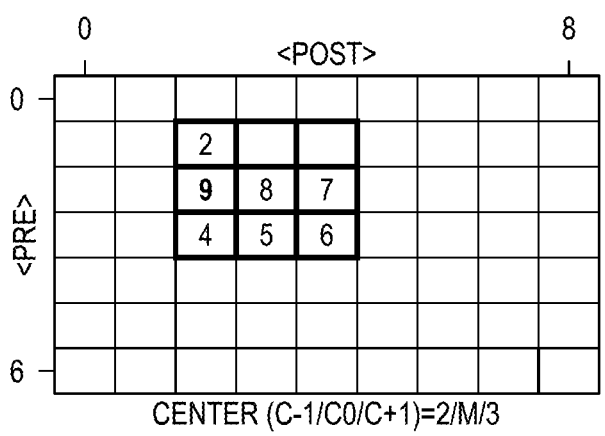

As illustrated in FIG. 6I, a request for a ninth coefficient (represented by the box with the number 9) occurs. The box with the number 9 is the same box that had the number 3 in FIGS. 6C-6H and thus, is the same coefficient as one that was previously used. Because the coefficient was previously used, the repeated coefficient may be used in a quality check. In another embodiment, a repeat counter may be incremented based on the repeated coefficient and after the coefficient has been repeated a predetermined number of times, then the repeated coefficient may be used in a quality check. In another embodiment, the coefficient that is used for the quality check is that coefficient that was used before the repeated coefficient. For example, the coefficient represented by the box with the number 8 in FIGS. 6H and 6I may be used.

Figure 7:
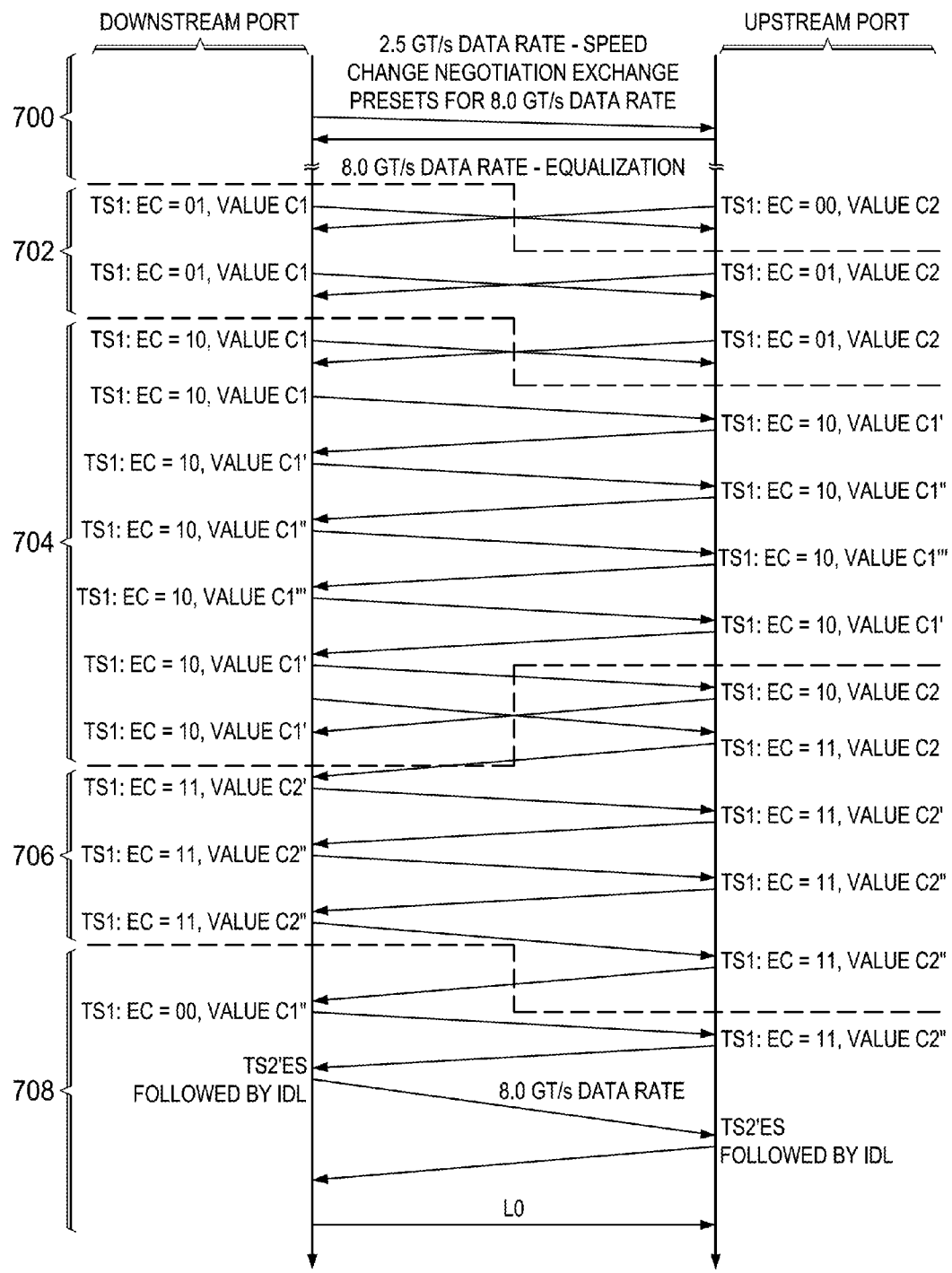
FIG. 7 is a simplified time diagram according to at least one example embodiment.

Referring to FIG. 7, FIG. 7 illustrates an equalization procedure according to at least one example embodiment. At 700, training sequence two (TS2) ordered sets may be sent from a downstream port to an upstream port. TS2 sets are typically 16 symbols long and in different states, the fields values change and may have different meaning Initially the link and lane numbers start as "PAD" and then progress to real numbers negotiated by both the upstream port and the downstream port. The numbers are settled by the time the equalization training is entered. If the equalization procedure is repeated and performed while the link between the downstream port and the upstream port is in a 8.0 GT/s data rate, then this stage may be skipped because there is no real need for the link to go to a 2.5 GT/s or a 5.0 GT/s data rate to resend the same TS2 ordered sets to convey the presets. At 702, both the downstream port and the upstream port may exchange training sequence one (TS1) ordered sets to establish an operational link. In one example, an electric idle exit ordered set (EIEOS) may be sent every thirty-two TS1 ordered sets.

At 704, the upstream port may request the downstream port to set its transmitter's coefficients (or presets) to have the incoming link of the upstream port comply with the electrical requirements of the upstream port. The downstream port may sent an EIEOS in up to 65536 TS1 ordered sets, based on a request from the upstream port. In the illustrated example, the upstream port requested the downstream port to set its transmitter's coefficient to a first coefficient C1, a second coefficient C1', a third coefficient C1", and a fourth coefficient C'". Then the upstream port made a repeated requested for the downstream port to set its transmitter's coefficient to the second coefficient C1'. Because the coefficient C1' was previously used, then the equalization procedure for the upstream port is completed.

At 706, the downstream port may request the upstream port to set its transmitter's coefficients (or presets) to have the incoming link of the downstream port comply with the electrical requirements of the downstream port. The upstream port may sent an EIEOS in up to 65536 TS1 ordered sets, based on a request from the downstream port. In the illustrated example, the downstream port requested the upstream port to set its transmitter's coefficient to a first coefficient C2, a second coefficient C2', and a third coefficient C2". In the illustrated example, third coefficient C2" is acceptable and the equalization procedure for the downstream port is completed. The first coefficient C2, second coefficient C2', and third coefficient C2" may or may not be the same as first coefficient C1, second coefficient C1', and third coefficient C1". At 708, equalization is complete for the upstream port and the downstream port and a link training status state machine (LTSSM) for the system goes through recovery.

Figure 8B:
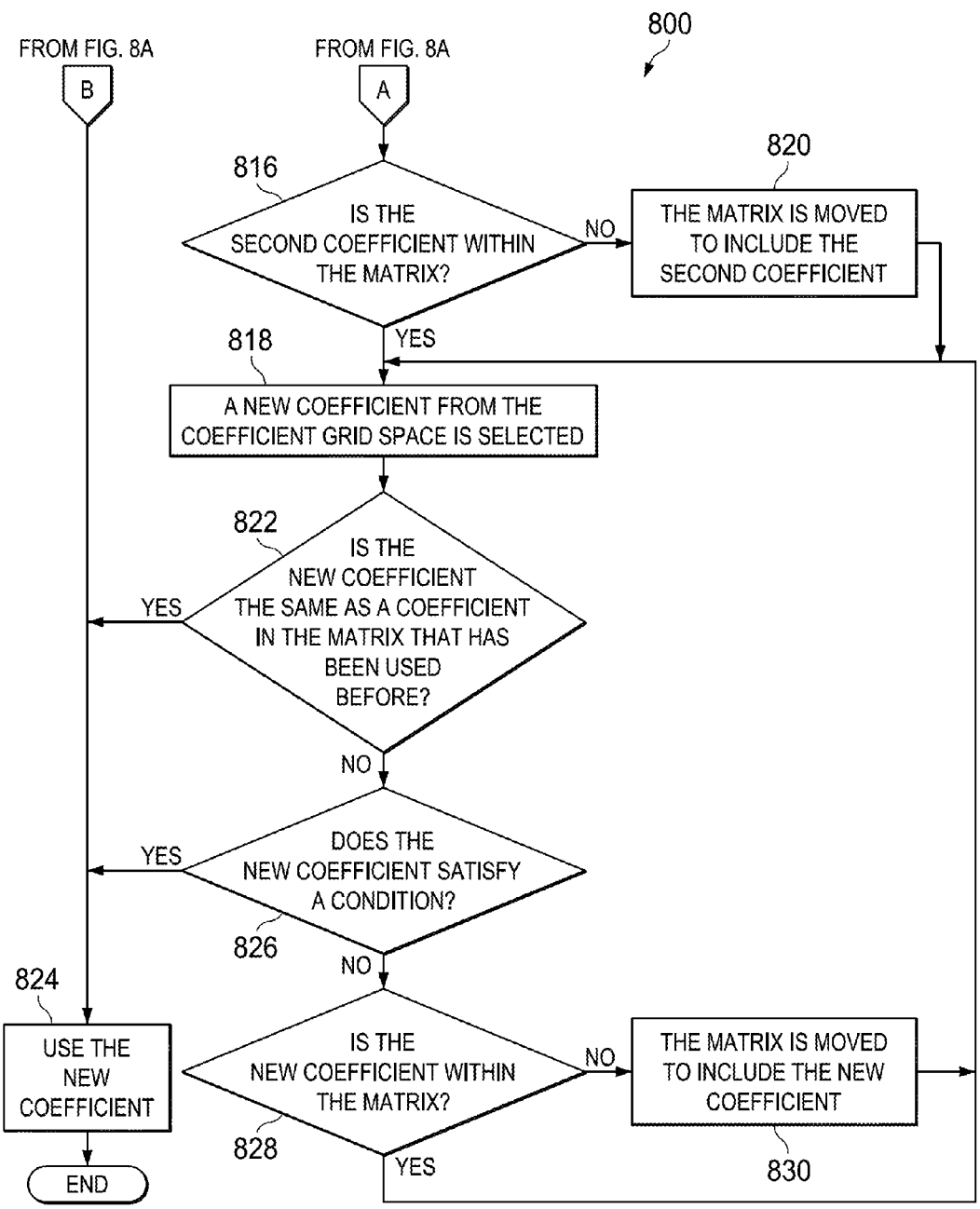

FIGS. 8A and 8B are flow diagrams showing a set of operations 800 according to at least one example embodiment. Apparatus, for example on-chip interface 110 and device 180 of FIG. 1, or a portion thereof, may utilize the set of operations 800. The apparatus may comprise means for performing the operations of FIG. 9. In an example embodiment, an apparatus is transformed by having memory, for example memory 195 and/or memory 197 of FIG. 1, comprising computer code configured to, working with a processor, cause the apparatus to perform set of operations 800.

At block 802, a staring coefficient from a coefficient grid space is selected. For example, equalization module 190 in physical logic 182 may select a coefficient. In this example, equalization module 190 is acting as a master equalization module. At block 804, the system determines if the starting coefficient satisfies a condition. For example, equalization module 192 in physical logic 184 may determine if the starting coefficient satisfies a condition. In this example, equalization module 192 is acting as a slave equalization module. The condition may be an acceptable BER. If the starting coefficient does satisfy the condition, then the starting coefficient is used, as in 806. If the starting coefficient does not satisfy the condition, then a matrix is centered on the starting coefficient, as in 808. At block 810, a second coefficient from the coefficient grid is selected. At block 812, the system determines if the second coefficient satisfies a condition. If the second coefficient satisfies the condition, then the second coefficient is used, as in 814. If the second coefficient does not satisfy the condition, then moving to FIG. 8B, the system determines if the second coefficient is within the matrix, as in 816. If the second coefficient is within the matrix, then a new coefficient from the coefficient grid space is selected, as in 818. If the second coefficient is not within the matrix, then the matrix is moved to include the second coefficient, as in 820. At block 818, a new coefficient from the coefficient grid space is selected.

At block 822, the system determines if the new coefficient is the same as a coefficient in the matrix that has been used before. For example, each coefficient in the matrix may be assigned an indicator to indicate if the coefficient has been selected before In this example, where equalization module 192 is a slave equalization module, the indicator is stored in memory 197. If equalization module 190 was the slave equalization module, then the indicator may be stored in memory 195. If the new coefficient is the same as a coefficient in the matrix that has been used before, then the new coefficient is used, as in 824. In another example, counter 198 (if equalization module 192 is a slave equalization module or counter 193 if equalization module 190 was the slave equalization module) keeps track of how many times the coefficient has been selected. If the coefficient has been selected a pre-determined number of time, then the new coefficient is used. If the new coefficient is not the same as a coefficient in the matrix that has been used before, then the system determines if the new coefficient satisfies a condition, as in 826. If the new coefficient does satisfy a condition, then the new coefficient is used, as in 824. If the new coefficient does not satisfy a condition, then the system determines if the new coefficient is within the matrix, as in 826. If the new coefficient is within the matrix, then a new coefficient from the coefficient grid space is selected, as in 818. If the new coefficient is not within the matrix, then the matrix is moved to include the new coefficient, as in 830. At 818, a new coefficient from the coefficient grid space is selected.

Figure 9B:
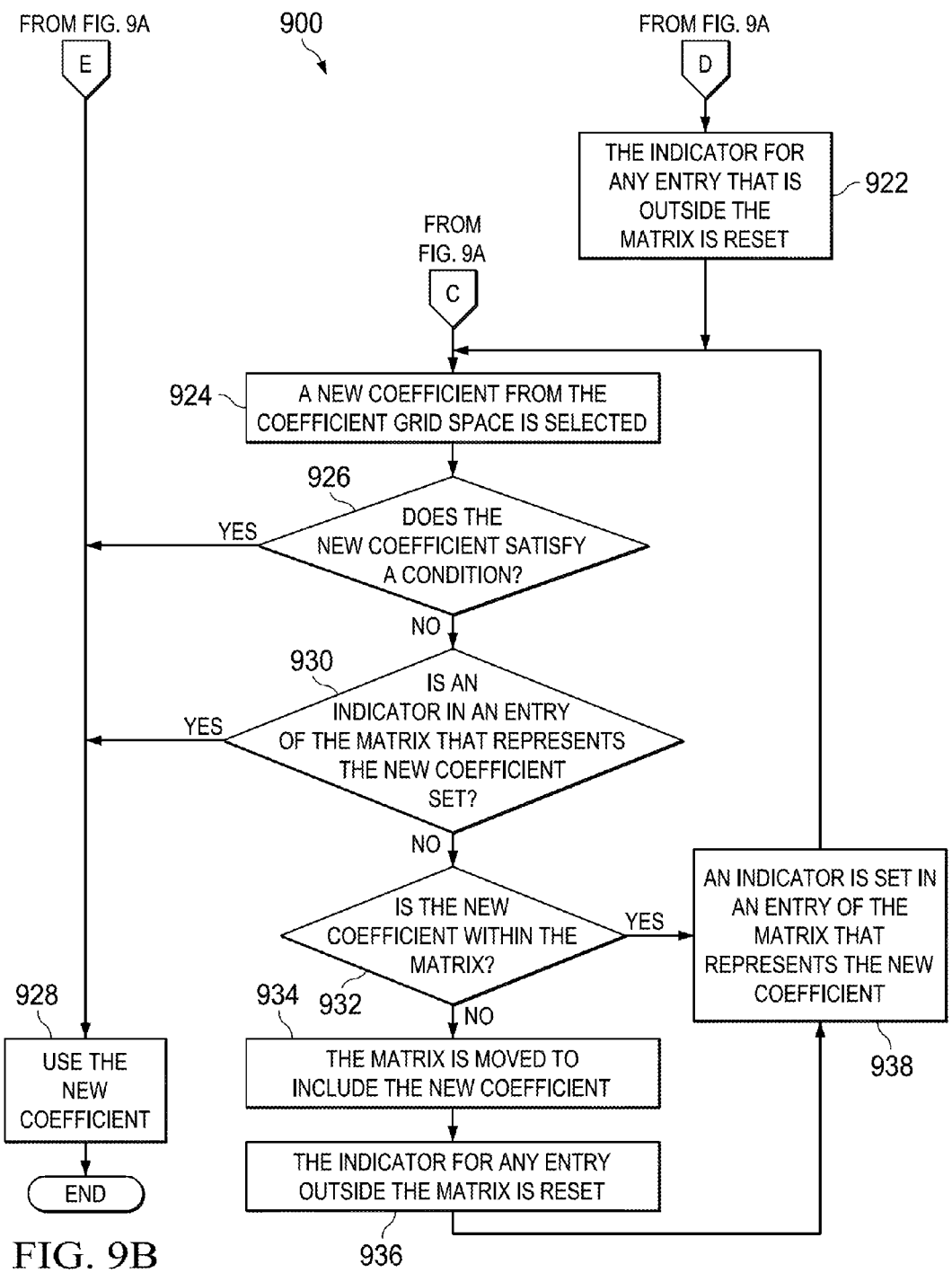

FIGS. 9A and 9B are flow diagrams showing a set of operations 900 according to at least one example embodiment. Apparatus, for example on-chip interface 110 and device 180 of FIG. 1, or a portion thereof, may utilize the set of operations 900. The apparatus may comprise means for performing the operations of FIG. 9. In an example embodiment, an apparatus is transformed by having memory, for example memory 195 and/or memory 197 of FIG. 1, comprising computer code configured to, working with a processor, cause the apparatus to perform set of operations 900.

At block 902, a starting coefficient from a coefficient grid space is selected. At block 904, the system determines if the starting coefficient satisfies a condition. If the starting coefficient does satisfy a condition, then the staring coefficient is used, as in 906. For example, the condition may be an acceptable BER. If the starting coefficient does not satisfy a condition, then a matrix is centered on the starting coefficient and an indicator is set in an entry of the matrix that represents the starting coefficient, as in 910. At block 912, a second coefficient from the coefficient grid space is selected and an indicator is set in an entry of the matrix that represents the second coefficient. At block 914, the system determines if the second coefficient satisfies a condition. If the second coefficient satisfies a condition, then the second entry is used, as in 916. If the second coefficient does not satisfy a condition, then the system determines if the second coefficient is within the matrix, as in 918. If the second coefficient is within the matrix, then, as shown in FIG. 9B, a new coefficient from the coefficient grid is selected, as in 924. If the second coefficient is not within the matrix, then the matrix is moved to include the second coefficient, as in 920. As shown in FIG. 9B, at block 922, an indicator for an entry that is outside the matrix is reset. At block 924, a new coefficient from the coefficient grid is selected.

At block 926, the system determines if the new coefficient satisfies a condition. If the new coefficient satisfies a condition, then the new coefficient is used, as in 928. If the new coefficient does not satisfy a condition, then the system determines if an indicator in an entry of the matrix that represents the new coefficient set, as in 930. In an example, the indicator is stored in memory 197 or memory 195. If an indicator in an entry of the matrix that represents the new coefficient is set, then the new coefficient is used, as in 928. If an indicator in an entry of the matrix that represents the new coefficient is not set, then the system determines if the new coefficient is within the matrix, as in 932. If the new coefficient is within the matrix, then an indicator is set in an entry of the matrix that represents the new coefficient, as in 938. If the new coefficient is not within the matrix, then the matrix is moved to include the new coefficient, as in 934. At block 936, the indicator for any entry outside the matrix is reset. At block 938, an indicator is set in an entry of the matrix that represents the new coefficient.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to identify requests for equalization coefficient updates and track a plurality of coefficient selections that are to relate to the requests. The plurality of coefficient selections are tracked and a matrix is maintained within a grid space that is to represent the coefficients. The matrix is adjusted within the grid space to obtain an adjusted matrix that is to accommodate selection of a particular coefficient outside the matrix, and one of the coefficient attempts is set as a final coefficient based on the adjusted matrix.

One or more examples can further provide centering the matrix on a grid unit corresponding to a starting coefficient selection.

One or more examples can further provide moving the matrix to include a second selected coefficient when the selected coefficient is outside the matrix centered on the grid unit.

One or more examples can further provide applying the set coefficient to an equalization of a data stream.

In at least one example, the equalization includes a back-channel equalization.

One or more examples can further provide determining a bit error rate for the data stream based at least in part on the set coefficient.

In at least one example, dimensions of the grid space are greater than dimensions of the matrix.

In at least one example, the dimensions of the matrix include seven grid units by seven grid units, where each grid unit represents a respective coefficient.

One or more embodiments may provide an apparatus, a system, a machine readable storage, a machine readable medium, and a method to select a starting coefficient from a grid space that represents coefficients, center a matrix on the starting coefficient, where the matrix includes a portion of the coefficients in the grid space, select a second coefficient from the grid space, select additional coefficients from the grid space until a selected coefficient satisfies a condition, and set a particular one of the coefficient included in the matrix as a final coefficient.

One or more examples can further provide moving the matrix to include the second coefficient if the second coefficient is outside the matrix.

One or more examples can further provide setting an indicator in the matrix for the starting coefficient, the second coefficient, and at least one other selected coefficient, where the indicator indicates that the starting coefficient, the second coefficient, and each other selected coefficient has been selected.

In at least one example, the indicator is single bit that represents a selected or a not selected state of each coefficient in the matrix.

In at least one example, a counter is to track how many times the selected coefficient has been selected.

In at least one example, the coefficient is used in a back channel equalization.

In at least one example, the condition includes an acceptable bit error rate (BER).

In at least one example, the condition includes selection of the particular coefficient a predetermined number of times.

One or more examples can further provide determining that the particular coefficient has been selected a predetermined number of times.

In at least one example, a master equalization module instructs a slave equalization module to select the starting coefficient, the second coefficient, and the selected coefficient.

One or more embodiments may provide an apparatus, a system, a machine readable storage, a machine readable medium, and a method to identify a data stream received from the first device, iteratively select a plurality of equalization coefficients, track selection of the plurality of coefficient selections using a matrix within a grid space, where the grid space is to represent possible coefficient values, the matrix represents a subset of the coefficient values, and location of the matrix within the grid space is to be adjusted to accommodate selected coefficient values that fall outside a previous location of the matrix, set a particular one of the coefficients as a final coefficient, and equalize the data stream based on the final coefficient.

In at least one example, the matrix has fixed dimensions.

One or more examples can further provide identifying selection of a starting coefficient value from the grid space, centering the matrix on the starting coefficient, identifying selection of a second coefficient value from the grid space, and determining whether the second coefficient value falls outside the matrix, where location of the matrix is to be adjusted to include the second coefficient value.

In at least one example, tracking selection of the plurality of coefficient selections using the matrix further includes setting an indicator in the matrix for each of the starting coefficient and the second coefficient, and the indicator is to indicate that the starting coefficient and the second coefficient have been selected.

In at least one example, tracking selection of the plurality of coefficient selections using the matrix includes tracking the number of time each respective coefficient value has been selected.

In at least one example, equalization of the data steam includes a back channel equalization.

One or more embodiments may provide an apparatus, a system, a machine readable storage, a machine readable medium, and a method to identify a data stream received from the first device, track a plurality of equalization coefficient selections using a matrix within a grid space, where the grid space is represents possible coefficient selection values, the matrix represents a subset of the coefficient selection values, and location of the matrix within the grid space is to be adjusted to accommodate coefficients selected outside the matrix, set a particular one of the coefficients as a final coefficient, and equalize the data stream based on the final coefficient.

In at least one example, the data stream is to be received over a Peripheral Component Interconnect Express (PCIe)-compliant interconnect.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   physical layer logic to:
      identify requests for updates to an equalization coefficient, wherein the equalization coefficient is to be used by the physical layer logic to establish a link with bit error characteristics within a particular range;
      track a plurality of equalization coefficient selections that correspond to the requests, wherein the physical layer logic is to maintain a matrix within a grid space to represent the plurality of equalization coefficients;
      adjust the matrix within the grid space to obtain an adjusted matrix to accommodate selection of a particular equalization coefficient outside the matrix; and
      set a particular one of the plurality of equalization coefficient selections as a final equalization coefficient for use in the link, wherein the particular equalization coefficient is included in the adjusted matrix.

2. The apparatus of claim 1, wherein the physical layer logic is further to center the matrix on a grid unit corresponding to a starting equalization coefficient selection.

3. The apparatus of claim 2, wherein the physical layer logic is further to move the matrix to include a second selected equalization coefficient when the selected equalization coefficient is outside the matrix centered on the grid unit.

4. The apparatus of claim 1, wherein the physical layer logic is further to apply the set equalization coefficient to an equalization of a data stream on the link.

5. The apparatus of claim 4, wherein the equalization comprises a backchannel equalization.

6. The apparatus of claim 4, wherein the physical layer logic is further to determine a bit error rate for the data stream based at least in part on the set equalization coefficient, wherein the bit error characteristics comprise the bit error rate.

7. The apparatus of claim 1, wherein dimensions of the grid space are greater than dimensions of the matrix.

8. The apparatus of claim 7, wherein the dimensions of the matrix comprise seven grid units by seven grid units, wherein each grid unit represents a respective equalization coefficient.

9. An apparatus comprising:
   logic to:
      select a starting equalization coefficient from a grid space that represents equalization coefficients;
      center a matrix on the starting equalization coefficient, wherein the matrix includes a portion comprising less than all of the equalization coefficients in the grid space;
      select a second equalization coefficient from the grid space;
      select additional equalization coefficients from the grid space until a selected equalization coefficient satisfies a condition of a link to connect at least two devices; and
      set a particular one of the equalization coefficients included in the matrix as a final equalization coefficient, wherein the final equalization coefficient is used to establish the link with the condition, and the condition corresponds to bit error characteristics of the link.

10. The apparatus of claim 9, wherein the logic is further to move the matrix to include the second equalization coefficient if the second equalization coefficient is outside the matrix.

11. The apparatus of claim 10, wherein the logic is further to set an indicator in the matrix for the starting equalization coefficient, the second equalization coefficient, and at least one other selected equalization coefficient, wherein the indicator indicates that the starting equalization coefficient, the second equalization coefficient, and each other selected equalization coefficient has been selected.

12. The apparatus of claim 11, wherein the indicator is single bit that represents a selected or a not selected state of each equalization coefficient in the matrix.

13. The apparatus of claim 9, wherein a counter is to track how many times the selected equalization coefficient has been selected.

14. The apparatus of claim 9, wherein the equalization coefficient is used in a back channel equalization.

15. The apparatus of claim 9, wherein the condition comprises an acceptable bit error rate (BER).

16. The apparatus of claim 9, wherein selection of the particular equalization coefficient a predetermined number of times is to cause the particular equalization coefficient to be used in a quality check.

17. The apparatus of claim 16, wherein the logic is further to determine that the particular equalization coefficient has been selected the predetermined number of times.

18. The apparatus of claim 9, wherein a master equalization module instructs a slave equalization module to select the starting equalization coefficient, the second equalization coefficient, and the selected equalization coefficient.

19. A method for providing back channel equalization, comprising:
   identifying a data stream received over a link from a first device;
   iteratively selecting a plurality of equalization coefficients;

determining, for each of the plurality of equalization coefficients whether the equalization coefficient causes the link to operate within a particular bit error range;

tracking selection of the plurality of equalization coefficients using a matrix within a grid space, wherein the grid space is to represent possible equalization coefficient values, the matrix represents a subset of the equalization coefficient values, and location of the matrix within the grid space is adjusted to accommodate selected equalization coefficient values that fall outside a previous location of the matrix;

setting a particular one of the equalization coefficients as a final equalization coefficient; and equalizing the data stream based on the final equalization coefficient.

20. The method of claim 19, wherein the matrix has fixed dimensions.

21. The method of claim 19, wherein tracking selection of the plurality of equalization coefficient selections using the matrix includes:

identifying selection of a starting equalization coefficient value from the grid space;

centering the matrix on the starting equalization coefficient;

identifying selection of a second equalization coefficient value from the grid space; and determining whether the second equalization coefficient value falls outside the matrix, wherein location of the matrix is to be adjusted to include the second equalization coefficient value.

22. The method of claim 21, wherein tracking selection of the plurality of equalization coefficient selections using the matrix further includes setting an indicator in the matrix for each of the starting equalization coefficient and the second equalization coefficient, and the indicator is to indicate that the starting equalization coefficient and the second equalization coefficient have been selected.

23. The method of claim 19, wherein tracking selection of the plurality of equalization coefficient selections using the matrix includes tracking the number of times each respective equalization coefficient value has been selected.

24. The method of claim 19, wherein equalization of the data stream comprises a back channel equalization.

25. A system comprising:

a first device; and a second device connected to the first device by an interconnect and comprising logic to:

identify a data stream received from the first device over a link of the interconnect;

track a plurality of equalization coefficient selections using a matrix within a grid space, wherein the grid space represents possible equalization coefficient selection values, the matrix represents a subset of the equalization coefficient selection values, and location of the matrix within the grid space is to be adjusted to accommodate a subsequent selection of one of the possible equalization coefficients outside the matrix;

set a particular one of the equalization coefficients as a final equalization coefficient; and equalize the data stream based on the final equalization coefficient.

26. The system of claim 25, wherein the interconnect comprises a Peripheral Component Interconnect Express (PCIe)-compliant interconnect.

27. The system of claim 25, wherein tracking selection of the plurality of equalization coefficient selections using the matrix includes:

identifying selection of a starting equalization coefficient value from the grid space;

centering the matrix on the starting equalization coefficient;

identifying selection of a second equalization coefficient value from the grid space; and determining whether the second equalization coefficient value falls outside the matrix, wherein location of the matrix is to be adjusted to include the second equalization coefficient value.

28. The system of claim 25, wherein tracking selection of the plurality of equalization coefficient selections using the matrix includes tracking the number of times each respective equalization coefficient value has been selected.

29. The system of claim 25, wherein equalization of the data stream comprises a back channel equalization.

* * * * *